April 28, 1931.  H. CASLER ET AL  1,803,169
BRAKE TESTING DEVICE
Filed Oct. 20, 1928   2 Sheets-Sheet 2
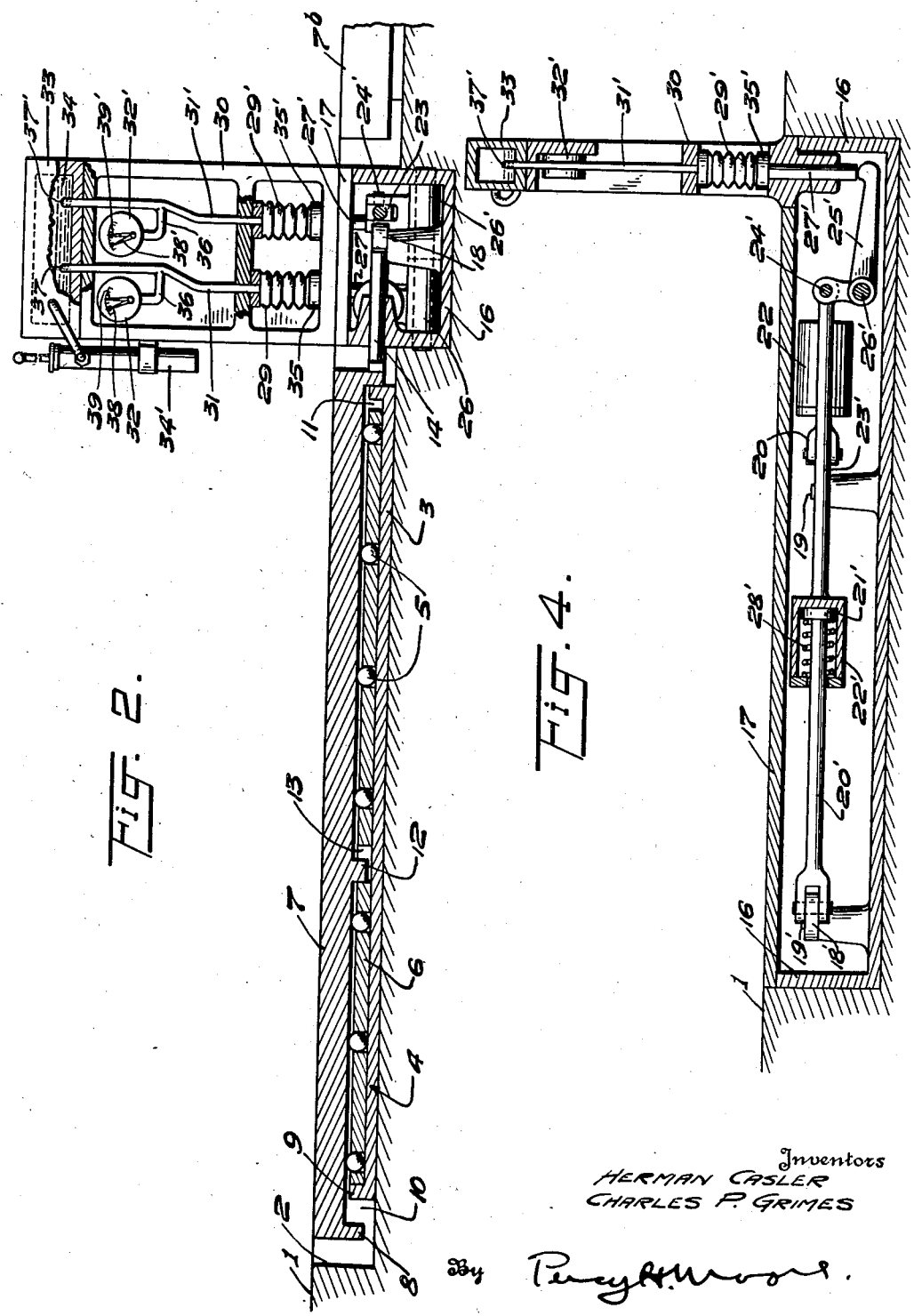
Inventors
HERMAN CASLER
CHARLES P. GRIMES
By Percy H. Moore
Attorney Patented Apr. 28, 1931

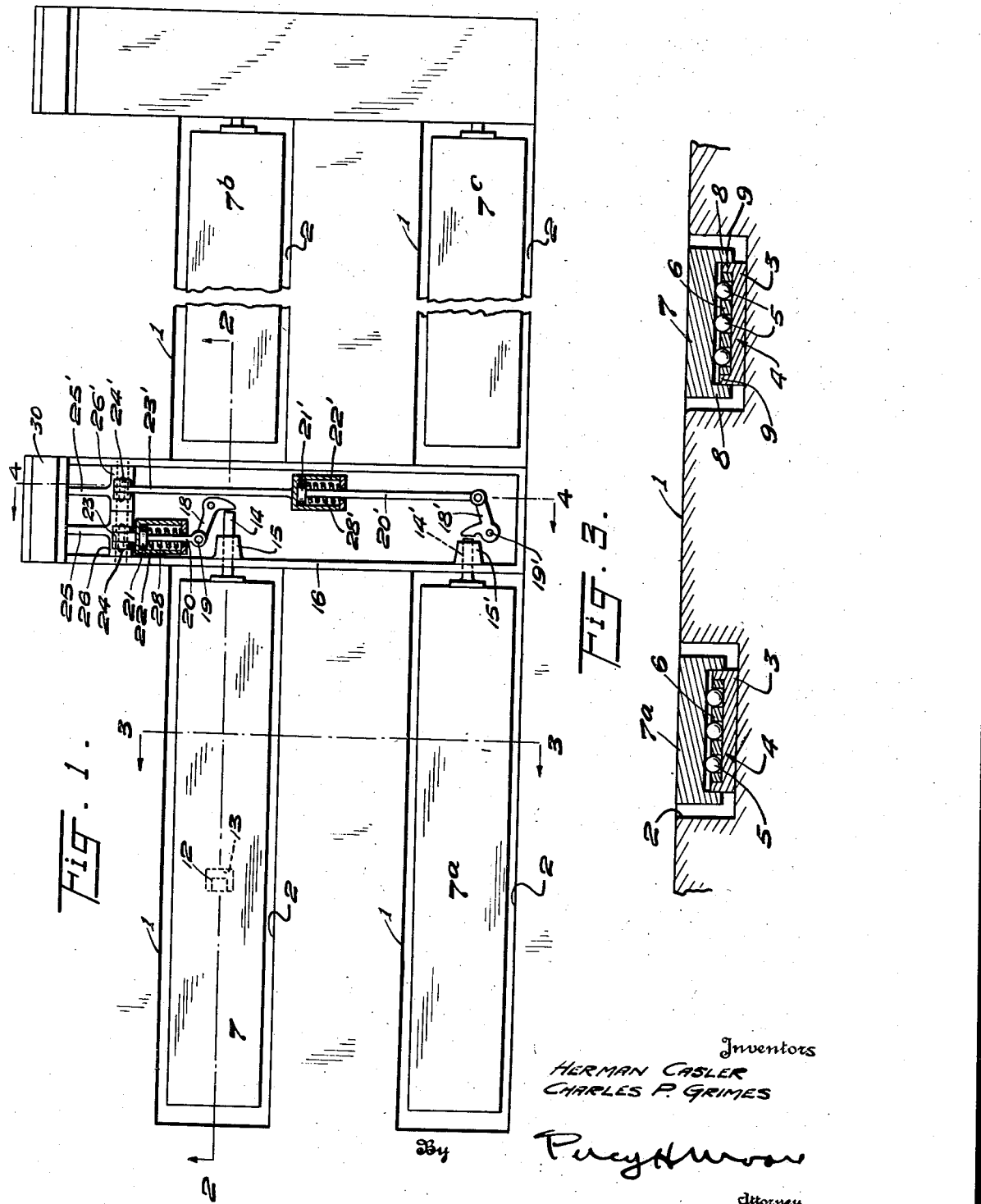

1,803,169

UNITED STATES PATENT OFFICE

HERMAN CASLER, OF CANASTOTA, AND CHARLES P. GRIMES, OF SYRACUSE, NEW YORK

BRAKE-TESTING DEVICE

Application filed October 20, 1928. Serial No. 313,787.

Our invention relates to apparatus for testing motor vehicle brakes and has for its object to provide a simple device of this nature by means of which it will be possible to accurately determine the relative brake resistance of the respective wheels.

Other objects and advantages of the invention will be apparent as the description is considered in connection with the accompanying drawings, in which:

Figure 1 is a plan view of the invention;

Figure 2 is a section on the line 2—2 of Figure 1.

Figure 3 is a section on the line 3—3 of Figure 1; and

Figure 4 is a section on the line 4—4 of Figure 1.

Referring more particularly to the drawings wherein like reference numerals refer to corresponding parts throughout the several views 1 denotes the concrete floor of a garage or other building in which the device is installed. Preferably the mechanism of the device is located in a suitable recess or cavity 2 so that the top of the device will be flush with the top of the floor. However, if deemed desirable the device may be mounted directly upon the floor, in which case, inclined approaches or ramps (not shown) would be employed.

In the embodiment illustrated base plates 3, four in number, mounted in cavities 2, support ball bearing frames 4, each comprising a plurality of anti-friction ball bearings 5 held in spaced relation by plates 6. These ball bearings support movable top plates 7, 7a, 7b and 7c, one for each ball bearing frame 4 and base plate 3, provided with side flanges 8 fitting over corresponding end flanges 9 formed upon the base plates. It will be noted that the flanges 8 and 9 cooperate to prevent dirt from collecting on the bearings 5 between the movable plates and the base plates.

When the movable top plates 7 are in normal or figure 2 position there will be a space or clearance 10 between the respective rear end flanges 8 and 9 of the top plates 7 and base plates 3, the purpose of which is to permit the top plates 7 to move forwardly under the load of a vehicle. For a similar purpose a clearance or space 11 is provided between the forward ends of the roller bearing plates 6 and the forwardmost end flanges 9 of the base plates 3. A lug 12 depending from each top plate 7 engages loosely within an opening 13 in the ball bearing plates 6, serves to keep the ball bearings and their plates in their normal or Figure 2 position, relatively to the base plate. Movement of the top plates with respect to the movement of the ball bearing frames will be at the ratio of 2 to 1, that is, when the top plates are carried forward a distance of two inches under the load of a vehicle, the ball bearings 5 and plates 6 will be moved in a corresponding direction a distance of one inch. In other words the ball bearing frames travel one half as far as the movable plates.

Connected to the forward ends of the rearmost pair of movable top plates 7a and 7b are plungers 14—14' which project through bearings 15—15' into a box 16 provided with a cover 17. These plungers respectively engage one arm of bell crank levers 18—18' pivotally mounted as at 19—19' in the box 16, the other arms of the bell cranks 18—18' being pivotally connected to connecting rods 20—20' the free ends of which are provided with heads 21—21' in turn loosely received within the enlarged portions 22—22' formed on the inner ends of connecting rods 23—23'. Coil springs 28—28' under more or less compression act to hold the heads 21—21' at the end of the space provided for the heads and springs and also serve as shock absorbers to relieve the sylphon bellows and gauge of any overload due to the use of a noncompressible fluid in the system which fluid cannot yield when subjected to any shock delivered by the movable plate.

The rods 23—23' are pivotally connected as at 24—24' respectively to bell crank levers 25—25', pivotally mounted in the box 16 as at 26—26'. The free ends of the bell cranks 25—25' engage beneath the lower ends of vertically disposed plungers 27—27' the upper ends of which are respectively connected to the bases 35—35' of sylphon bellows 29—29' mounted in the frame 30. Tubes 31—31' connect the bellows with gauges 32—32' and a tank 33, the latter being partially filled with a suitable liquid 34. The upper ends of the tubes 31—31' are provided with minute or restricted passages 37—37' which serve to relieve any excessive pressure or vacuum in the system caused by the expansion or contraction of the fluid therein due to temperature changes. Providing the tank or reservoir 33 is placed a suitable distance above the sylphon bellows 29—29' then the weight of the liquid in tubes 31—31' and reservoir 33 will be adequate to return the movable top plates 7—7a—7b—7c to normal position. However, should the height of reservoir 33 be such that weight of liquid be insufficient to return the top plates to normal or Figure 2 position, air under pressure may be pumped into the top of reservoir 33 by means of the hand pump 34.

As the construction and mounting of the forward movable platforms 7b and 7c and the gauge and gauge mechanism therefor is identical with that of the rear movable platforms or plates 7 and 7a description of the former is deemed unnecessary.

In practice the wheels of the automobile, the brakes of which are being tested, are driven upon the movable platforms 7, 7a, 7b and 7c, and while in motion, the brakes are simultaneously applied to the four wheels in the usual manner. The drag of the wheels caused by the application of the brakes will cause the movable platforms to move forwardly. As the description of the action of one movable plate will suffice for all, the operation of platform 7a will be briefly described. Forward movement of the platform 7a under the braking action of the right rear wheel of the vehicle will carry the plunger 14' forwardly thus rocking the bell crank 18' on its pivot 19' and pulling the rods 20' and 23' to the right, Figure 1. Lever 25' will then be caused to elevate vertical plunger 27' which in turn lifts the base 35' of the sylphon bellows 29' and contracts the latter. This contraction of the bellows causes the liquid in the bellows to rise and pass very slowly through orifices 37' into tank 33 thus creating a pressure in tube 31' which is communicated through by-pass 36' to gauge 32'. This gauge is of ordinary and well known construction adapted to indicate a momentary pressure reading. Pressure of the liquid causes the primary and secondary pointers 38' and 39' respectively to move in the usual manner thus indicating the retarding force of the brake.

When the vehicle is removed from the testing device the pressure of the liquid will return the movable platform and gauge actuating mechanism back to normal position, but should the pressure be insufficient for this purpose, the hand pump 34' is employed to pump air into the tank 33, on top of the fluid, care being taken not to get air into the system.

The primary pointer of the gauge will be automatically returned to zero position but the secondary pointer will remain at maximum pressure until brought back to zero reading on the gauge by manual control (not shown).

Having thus described our invention what we claim is:

1. A testing device for brakes used on automobile wheels and the like, comprising a base, a platform mounted on said base and adapted to be longitudinally moved with respect thereto, when the brakes are applied while a wheel is moving over said member, a liquid reservoir, a sylphon bellows having a passage leading to and in communication with said reservoir, a pressure indicator gauge communicating with said passage, and connections between said bellows and movable platform whereby movement of the latter will contract the bellows and force liquid through said passage into said gauge to indicate the retarding force induced by the brakes.

2. A testing device for brakes used on automobile wheels and the like, comprising a pair of parallel base members, a pair of platforms independently movable mounted upon said base members and adapted to receive the wheels of an automobile, a liquid reservoir mounted above and common to said platforms, a gauge for each platform, separate means connected to each platform and its associated gauge and communicating with the reservoir, said means adapted to force liquid to said reservoir and gauges to cause said gauges to register the thrust of its associated platform when the brakes are applied to the wheels while the latter are moving along said members.

3. A testing device for brakes used on automobile wheels and the like, comprising a pair of parallel base members, a pair of platforms independently movable mounted upon said base members and adapted to receive the wheels of an automobile, a liquid reservoir mounted above and common to said platforms, a gauge for each platform, separate means connected to each platform and its associated gauge adapted to force a liquid to said gauge to cause said gauge to register the thrust of its associated platform when the brakes are applied to the wheels while the latter are moving along said members, said separate means including a restricted passage communicating with said reservoir adapted to compensate for expansion, contraction or leakage of said liquid.

4. A testing device for brakes used on vehicles comprising a movable plate adapted to be overrun and horizontally shifted by a vehicle wheel when the brakes are applied to said wheel while moving over said plate, a gauge adapted to indicate the retarding force actuating said movable plate, said gauge actuated by a liquid medium under pressure created by the movement of said movable plate, and means associated with said liquid medium compensating for expansion, contraction or leakage of said liquid medium.

5. A testing device for brakes used on vehicles comprising a movable plate adapted to be overrun and horizontally shifted by a vehicle wheel when the brakes are applied to said wheel while moving over said plate, a liquid reservoir adapted to contain a substantially noncompressible liquid, a pressure gauge adapted to indicate the retarding force actuating said movable plate, a bellows operatively connected to said movable plate and having passages leading to said reservoir and to said gauge, the passing leading to said reservoir having a restricted opening whereby the expansion, contraction or leakage of liquid contained in said bellows and passage is compensated for.

In testimony whereof we affix our signatures.

HERMAN CASLER.
CHARLES P. GRIMES.